United States Patent
Suzuki

(10) Patent No.: US 7,421,543 B2
(45) Date of Patent: Sep. 2, 2008

(54) NETWORK DEVICE, FIBER CHANNEL SWITCH, METHOD FOR SHARED MEMORY ACCESS CONTROL, AND COMPUTER PRODUCT

(75) Inventor: Kazuhiko Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 11/087,247

(22) Filed: Mar. 23, 2005

(65) Prior Publication Data

US 2006/0123203 A1   Jun. 8, 2006

(30) Foreign Application Priority Data

Dec. 2, 2004   (JP)   ............... 2004-350094

(51) Int. Cl.
*G06F 12/00* (2006.01)
(52) U.S. Cl. .................................... 711/147
(58) Field of Classification Search ............... 711/147, 711/148; 709/213, 214; 710/316
See application file for complete search history.

(56) References Cited

U.S. PATENT DOCUMENTS

| | | | |
|---|---|---|---|
| 6,314,501 B1* | 11/2001 | Gulick et al. ............. | 711/153 |
| 6,728,839 B1* | 4/2004 | Marshall ................... | 711/137 |
| 6,826,653 B2* | 11/2004 | Duncan et al. ............ | 711/141 |
| 6,850,998 B2* | 2/2005 | Inoue et al. ............... | 710/38 |
| 7,000,070 B2* | 2/2006 | Moriwaki et al. ......... | 711/114 |
| 7,096,338 B2* | 8/2006 | Takahashi et al. ......... | 711/165 |
| 7,249,234 B2* | 7/2007 | Higaki et al. ............. | 711/162 |
| 2003/0026267 A1* | 2/2003 | Oberman et al. .......... | 370/397 |
| 2005/0246505 A1* | 11/2005 | McKenney et al. ........ | 711/151 |

OTHER PUBLICATIONS http://primeserver.fujitsu.com/primepower/product/soft/primecluster/global_services.html (searched Nov. 2004).

* cited by examiner

*Primary Examiner*—Hiep T Nguyen
(74) *Attorney, Agent, or Firm*—Greer, Burns & Crain, Ltd.

(57) ABSTRACT

A shared memory access function providing unit of each of a plurality of host computers of a network device receives an access shared memory request from an application and issues the access shared memory request to an FC switch. An access shared memory request identifying unit of the FC switch determines whether the request from the host computer is an access shared memory request, and if the request is an access shared memory request, a shared memory control unit controls the access to a shared data memory unit based on the access shared memory request.

6 Claims, 7 Drawing Sheets

NETWORK DEVICE, FIBER CHANNEL SWITCH, METHOD FOR SHARED MEMORY ACCESS CONTROL, AND COMPUTER PRODUCT

BACKGROUND OF THE INVENTION

1) Field of the Invention

The present invention relates to a network device that connects a plurality of host computers. More particularly, the present invention relates to a network device, a fiber channel switch that can be shared by a plurality of host computers and a method for shared memory access control.

2) Description of the Related Art

Conventionally, information (data) is shared by host computers, (hereinafter, "hosts") by connecting all the hosts to a common disk device, and the information is shared by writing the information to the common disk.

However, a shared disk to be shared by the hosts can only be built if all the sharing hosts form a logical group in the form of a cluster environment. This is possible only when all the hosts have the same platform, i.e., the operating system (hereinafter, "OS"). Thus, it is not possible to share a common disk device if even one host has a different OS.

Moreover, a plurality of channel adapters (CA) is required in the shared disk device. This makes the disk array device expensive.

SUMMARY OF THE INVENTION

It is an object of the present invention to at least solve the problems in the conventional technology.

According to an aspect of the present invention, a network device connects a plurality of host computers and includes a shared data memory unit that is used as a memory area shared by the host computers; and an access control unit that controls access of the shared data memory unit by the host computers.

The network device can be a fiber channel switch or an IP switch.

According to another aspect of the present invention, a method of controlling access of a shared memory that is shared by a plurality of host computers connected by a network device includes transferring a shared memory access request to access the shared memory from an application by a host computer to the network device; and controlling access of the shared memory provided in a local device of the network device, based on the shared memory access request transferred at the transferring.

According to still another aspect of the present invention, a computer-readable recording medium stores therein a computer program that causes a computer in a network device, which connects a plurality of host computers, to execute receiving a shared memory access request from the host computers; and controlling access of the shared memory provided in the network device, based on the shared memory access request received at the receiving.

The other objects, features, and advantages of the present invention are specifically set forth in or will become apparent from the following detailed description of the invention when read in conjunction with the accompanying drawings.

DETAILED DESCRIPTION

Exemplary embodiments according to the present invention are explained next with reference to the accompanying drawings. Further, the present invention is explained by focusing on the fiber channel switch.

Figure 1:
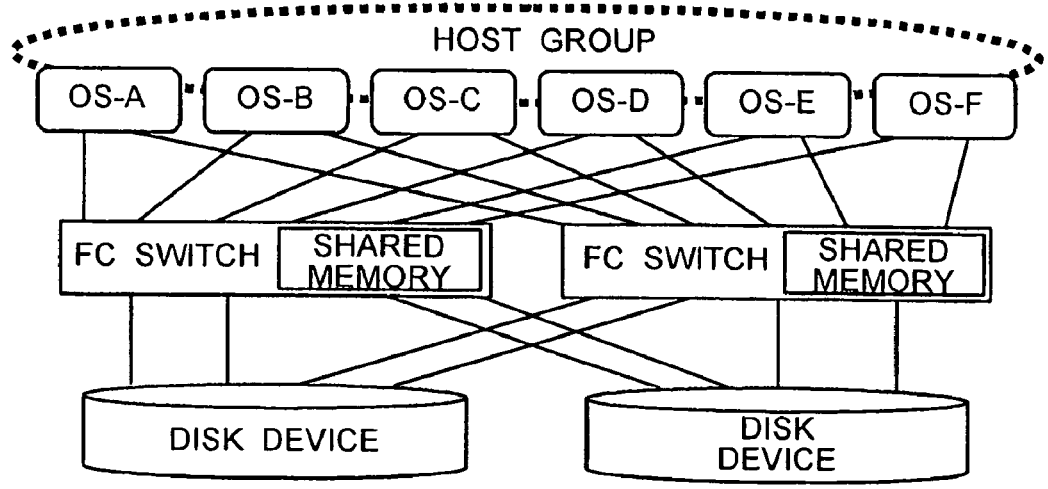
FIG. 1 is a drawing for explaining the concept of a shared memory provided by an FC switch according to an embodiment of the present invention.

A concept of a shared memory provided by a fiber channel switch (hereinafter, "FC switch") according to an embodiment of the present invention is explained below. FIG. 1 is a schematic diagram for explaining the concept of a shared memory provided by the FC switch according to the present embodiment.

As shown in FIG. 1, FC switches are used to connect host computers and disk devices that form a storage area network (SAN). The OS of the hosts that are connected to the FC switch need not be the same. It is assumed that hosts with different OS, OS-A through OS-F, are connected to the FC switch.

A shared memory, which is shared by the hosts, is provided in each FC switch. As a result, the shared memory can be provided even to the hosts with different OS.

Figure 2:
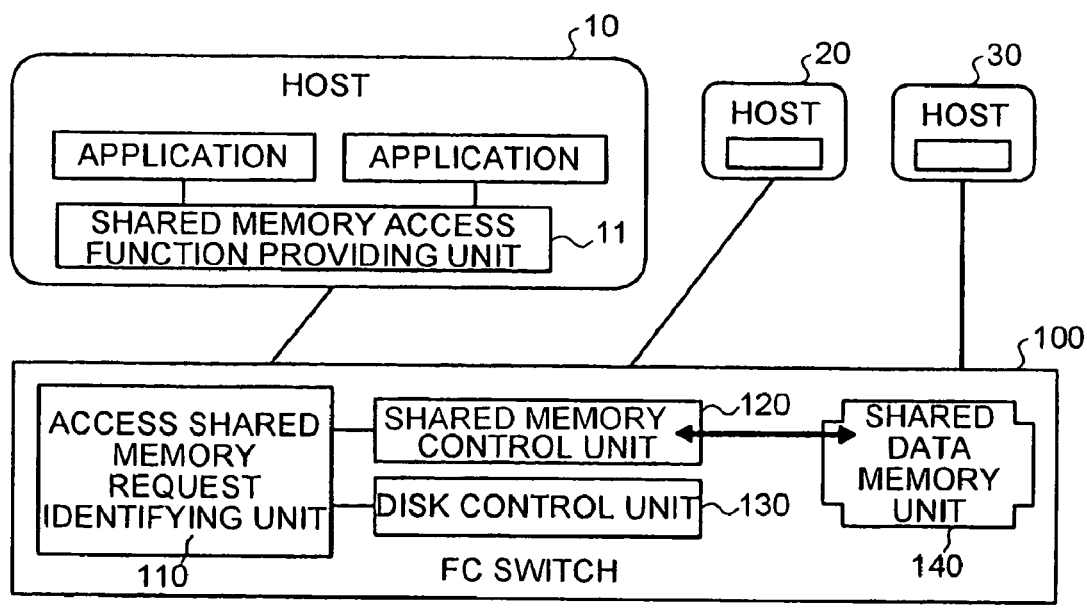
FIG. 2 is a functional block diagram of a shared memory system according to the embodiment.

FIG. 2 is a functional block diagram of a shared memory system according to the embodiment. The shared memory system includes hosts 10 through 30 and an FC switch 100 connected to the hosts 10 through 30.

Although only three hosts are shown in the figure, the number of hosts can be more or less. Moreover, the OS of the hosts can be the same or different.

Each host includes a shared memory access function providing unit 11. The shared memory access function providing unit 11 provides shared memory access functions to enable the hosts to access the shared memory provided in the FC switch 100 to run applications.

To be specific, the shared memory access function providing unit 11 provides the following functions as the shared memory access functions, and requests the FC switch 100 to execute the shared memory access.

Allocation of the shared memory (allocate)—requests allocation of the memory to be shared by the hosts.

Freeing of the shared memory (free)—requests release of the shared memory that is allocated.

Opening of the shared memory (open)—requests declaration of accessibility of the shared memory (switching to "shared memory accessible" state).

Closing of the shared memory (close)—requests declaration of inaccessibility of the shared memory (switching to "shared memory inaccessible" state).

Reading of the shared memory (read)—requests reading of data in the shared memory.

Writing of the shared memory (write)—requests writing of data to the shared memory.

Locking or unlocking of the shared memory (lock) or (unlock)—requests locking or unlocking for the shared memory.

The FC switch 100 includes an access shared memory request identifying unit 110, a shared memory control unit 120, a disk control unit 130, and a shared data memory unit 140.

The access shared memory request identifying unit 110 receives a request from the host and identifies whether the request is an access shared memory request. If the request is an access shared memory request, the access shared memory request identifying unit 110 passes the request to the shared memory control unit 120, and if the request is not an access shared memory request, the access shared memory request identifying unit 110 passes the request to the disk control unit 130.

The shared memory control unit 120 receives the access shared memory request from the hosts 10 through 30 via the access shared memory request identifying unit 110, and accesses the shared data memory unit 140, which is the shared memory.

The shared memory control unit 120 enables the hosts 10 through 30 to use the shared memory data 140 as the shared memory by receiving the access shared memory request from the hosts 10 through 30, and accessing the shared data memory unit 140 based on the access shared memory request.

The disk control unit 130 receives an access disk request from the hosts 10 through 30 via the access shared memory request identifying unit 110, and accesses the disk.

The shared data memory unit 140 is a memory unit that is used as the shared memory. Although flash memory is used as the shared data memory unit 140 in the present embodiment, other memory media such as disks, or a memory device may also be used.

Figure 3:
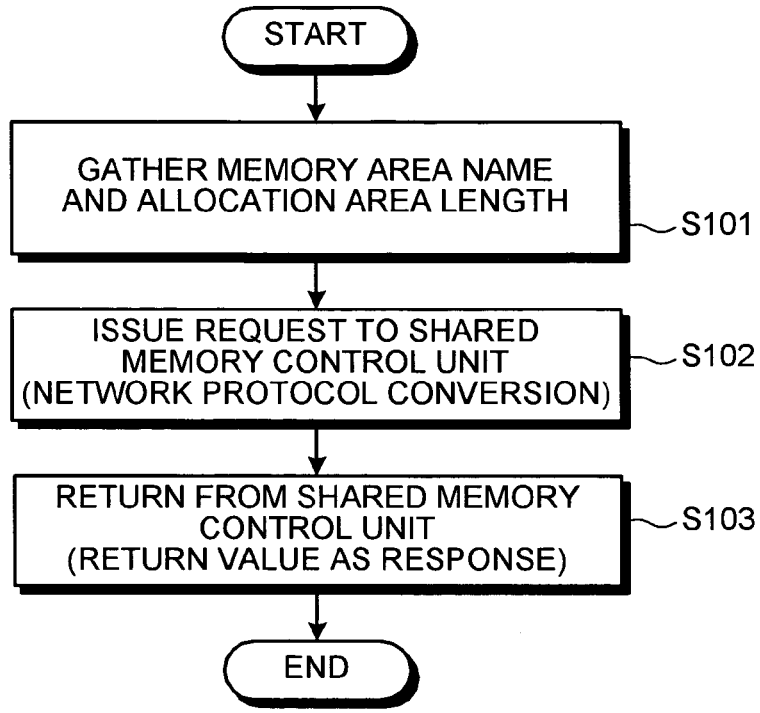
FIG. 3 is a flowchart of a shared memory allocation process.

The processes performed by the shared memory access function providing unit 11 are explained next with reference to FIG. 3 through FIG. 9. FIG. 3 is a flowchart of a shared memory allocation process. As shown in FIG. 3, the shared memory access function providing unit 11 gathers a memory area name, which is the name of the area used as the shared memory, and an allocation area length, which is the length of the area, from the application (step S101).

Based on the gathered information, the shared memory access function providing unit 11 issues an allocate shared memory request to the shared memory control unit 120 of the FC switch 100 (step S102). In other words, the shared memory access function providing unit 11 performs a protocol conversion to transmit the allocate shared memory request from the application to the FC switch 100.

The shared memory access function providing unit 11 receives from the shared memory control unit 120a response to the issued allocate shared memory request as a return value, and passes the received return value to the application (step S103).

Thus, by requesting the FC switch 100 to allocate the shared memory based on the allocate shared memory request from the application, the shared memory access function providing unit 11 enables allocation of the shared memory in the FC switch 100 that can be shared by the hosts.

Figure 4:
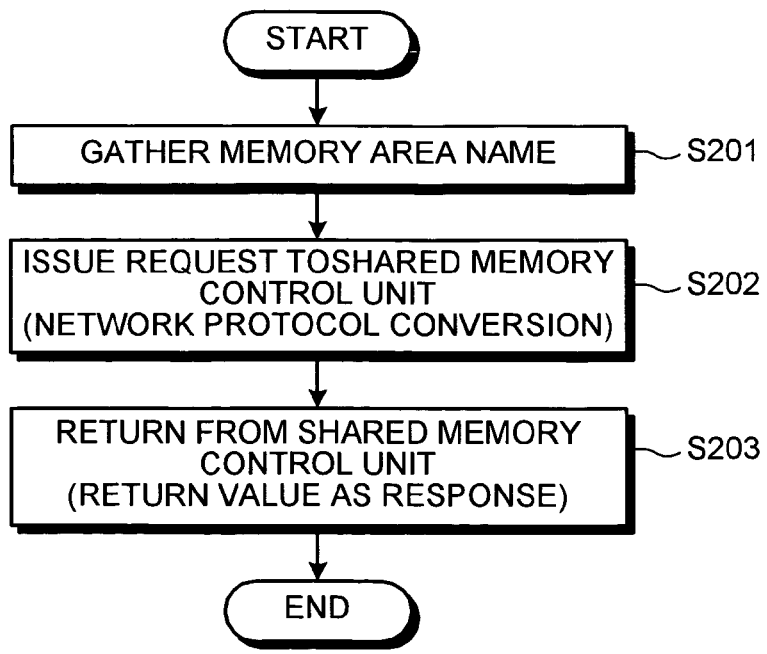
FIG. 4 is a flowchart of a shared memory release process.

FIG. 4 is a flowchart of a shared memory release process. As shown in FIG. 4, the shared memory access function providing unit 11 gathers a memory area name, which is the name of the area used as the shared memory from the application (step S201).

Based on the gathered information, the shared memory access function providing unit 11 issues a free shared memory request to the shared memory control unit 120 of the FC switch 100 (step S202). In other words, the shared memory access function providing unit 11 performs a protocol conversion to transmit the free shared memory request from the application to the FC switch 100.

The shared memory access function providing unit 11 receives from the shared memory control unit 120a response to the issued free shared memory request as a return value, and passes the received return value to the application (step S203).

Thus, by requesting the FC switch 100 to release the shared memory based on the free shared memory request from the application, the shared memory access function providing unit 11 enables release of the shared memory in the FC switch 100 that is shared by the hosts.

Figure 5:
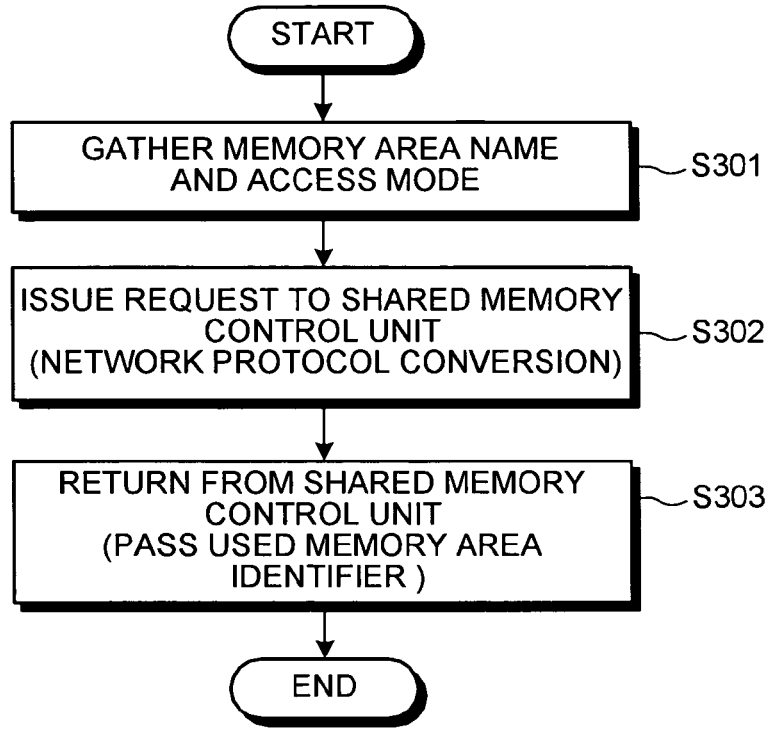
FIG. 5 is a flowchart of a shared memory opening process.

FIG. 5 is a flowchart of a shared memory opening process. As shown in FIG. 5, the shared memory access function providing unit 11 gathers a memory area name, which is the name of the area allocated as the shared memory, and an access mode from the application (step S301).

Based on the gathered information, the shared memory access function providing unit 11 issues an open shared memory request to the shared memory control unit 120 of the FC switch 100 (step S302). In other words, the shared memory access function providing unit 11 performs a protocol conversion to transmit the open shared memory request from the application to the FC switch 100.

The shared memory access function providing unit 11 receives from the shared memory control unit 120 a used memory area identifier that identifies the area opened by the issued open shared memory request and passes the received used memory area identifier to the application (step S303).

Thus, by requesting the FC switch 100 to open the shared memory based on the open shared memory request from the application, the shared memory access function providing unit 11 enables opening of the shared memory in the FC switch 100 that is shared by the hosts.

Figure 6:
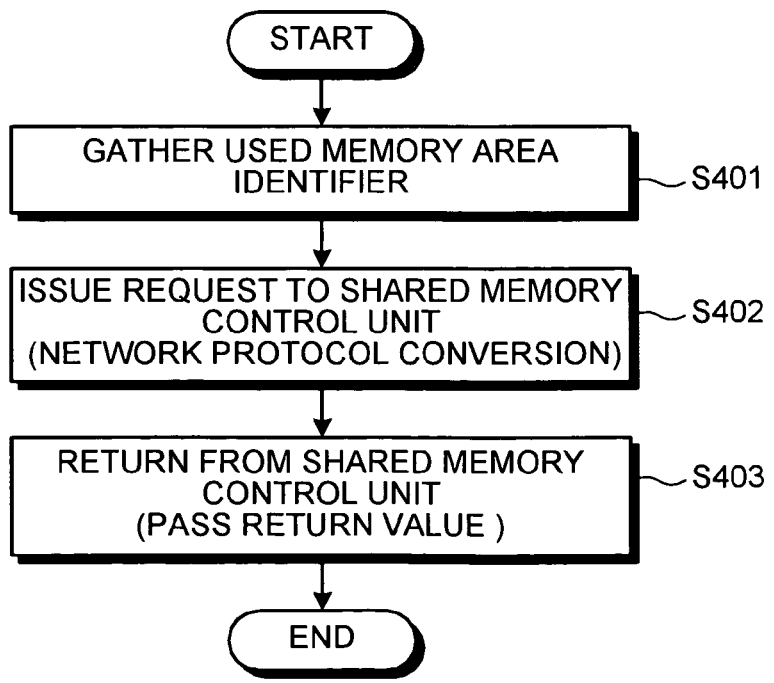
FIG. 6 is a flowchart of a shared memory closing process.

FIG. 6 is a flowchart of a shared memory closing process. As shown in FIG. 6, the shared memory access function providing unit 11 gathers a used memory area identifier that identifies the area used as the shared memory from the application (step S401).

Based on the gathered information, the shared memory access function providing unit 11 issues a close shared memory request to the shared memory control unit 120 of the FC switch 100 (step S402). In other words, the shared memory access function providing unit 11 performs a protocol conversion to transmit the close shared memory request from the application to the FC switch 100.

The shared memory access function providing unit 11 receives from the shared memory control unit 120 a response to the issued close shared memory request as a return value, and passes the received return value to the application (step S403).

Thus, by requesting the FC switch 100 to close the shared memory based on the close shared memory request from the application, the shared memory access function providing unit 11 enables closing of the shared memory in the FC switch 100 that is shared by the hosts.

Figure 7:
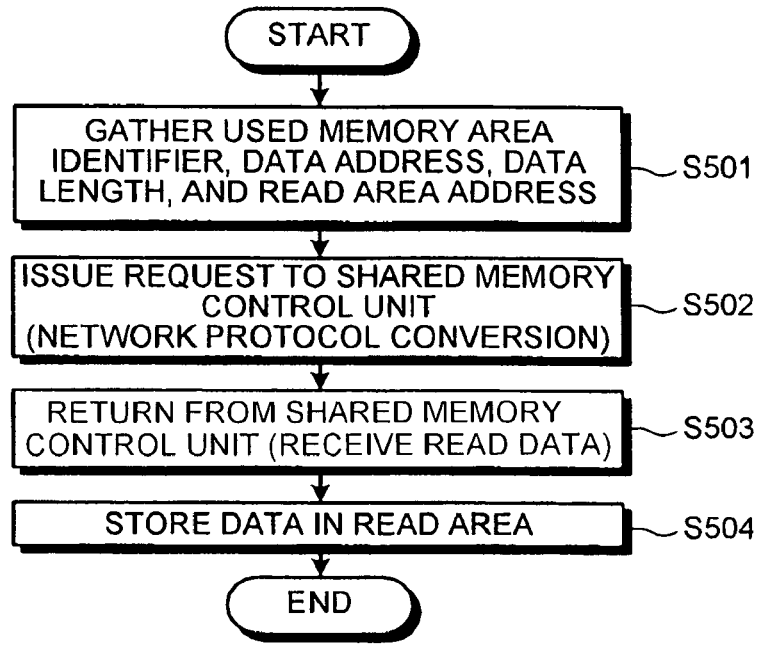
FIG. 7 is a flowchart of a shared memory read process.

FIG. 7 is a flowchart of a shared memory read process. As shown in FIG. 7, the shared memory access function providing unit 11 gathers a used memory area identifier, a data address (memory area name) which is the address of the shared memory that reads out data, a data length which is the length of the data read from the shared memory, and a read area address which is the address of the memory location of the data to be read from the shared memory from the application (step S501).

Based on the gathered information, the shared memory access function providing unit 11 issues a read shared memory request to the shared memory control unit 120 of the FC switch 100 (step S502). In other words, the shared memory access function providing unit 11 performs a protocol conversion to transmit the read shared memory request from the application to the FC switch 100.

The shared memory access function providing unit 11 receives the data sent from the FC switch 100 in response to the issued read shared memory request (step S503), and stores the received data in the read area (step S504). The shared memory access function providing unit 11 then passes the process result to the application.

Thus, by requesting the FC switch 100 to read the shared memory based on the read shared memory request from the application, and writing the received data in a specified area, the shared memory access function providing unit 11 enables reading of data from the shared memory in the FC switch 100 that is shared by the hosts.

Figure 8:
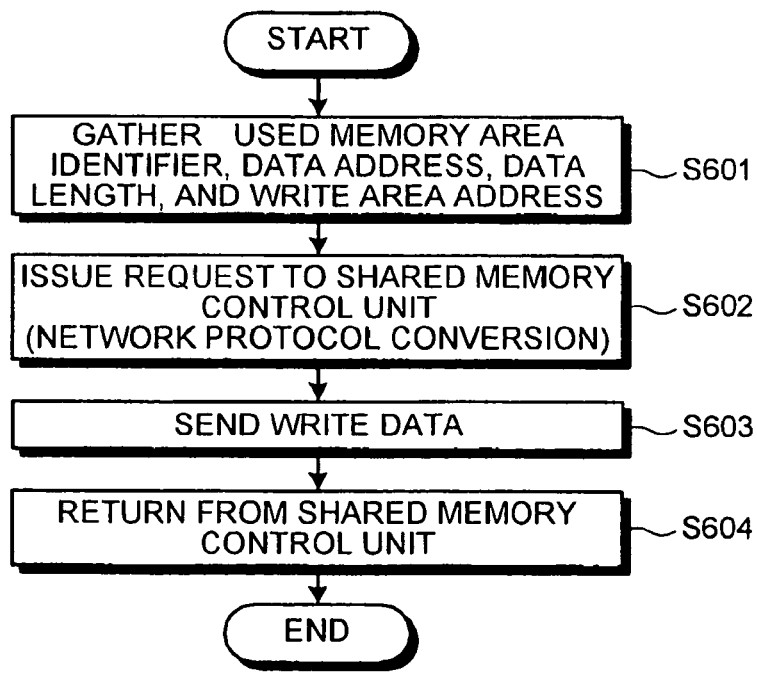
FIG. 8 is a flowchart of a shared memory write process.

FIG. 8 is a flowchart of a shared memory write process. As shown in FIG. 8, the shared memory access function providing unit 11 gathers a used memory area identifier, a data address (memory area name) which is the address of the shared memory that writes data, a data length which is the length of the data written to the shared memory, and a write area address which is the address of the storage location of the data written to the shared memory from the application (step S601).

Based on the gathered information, the shared memory access function providing unit 11 issues a write shared memory request to the shared memory control unit 120 of the FC switch 100 (step S602). In other words, the shared memory access function providing unit 11 performs a protocol conversion to transmit the write shared memory request from the application to the FC switch 100.

The shared memory access function providing unit 11 sends the write data to the FC switch 100 (step S603), and receives a response from the shared memory control unit 120 (step S604). The shared memory access function providing unit 11 then passes the received response is passed to the application.

Thus, by requesting the FC switch 100 to write the shared memory based on the write shared memory request from the application, the shared memory access function providing unit 11 enables writing of data to the shared memory in the FC switch 100 that is shared by the hosts.

Figure 9:
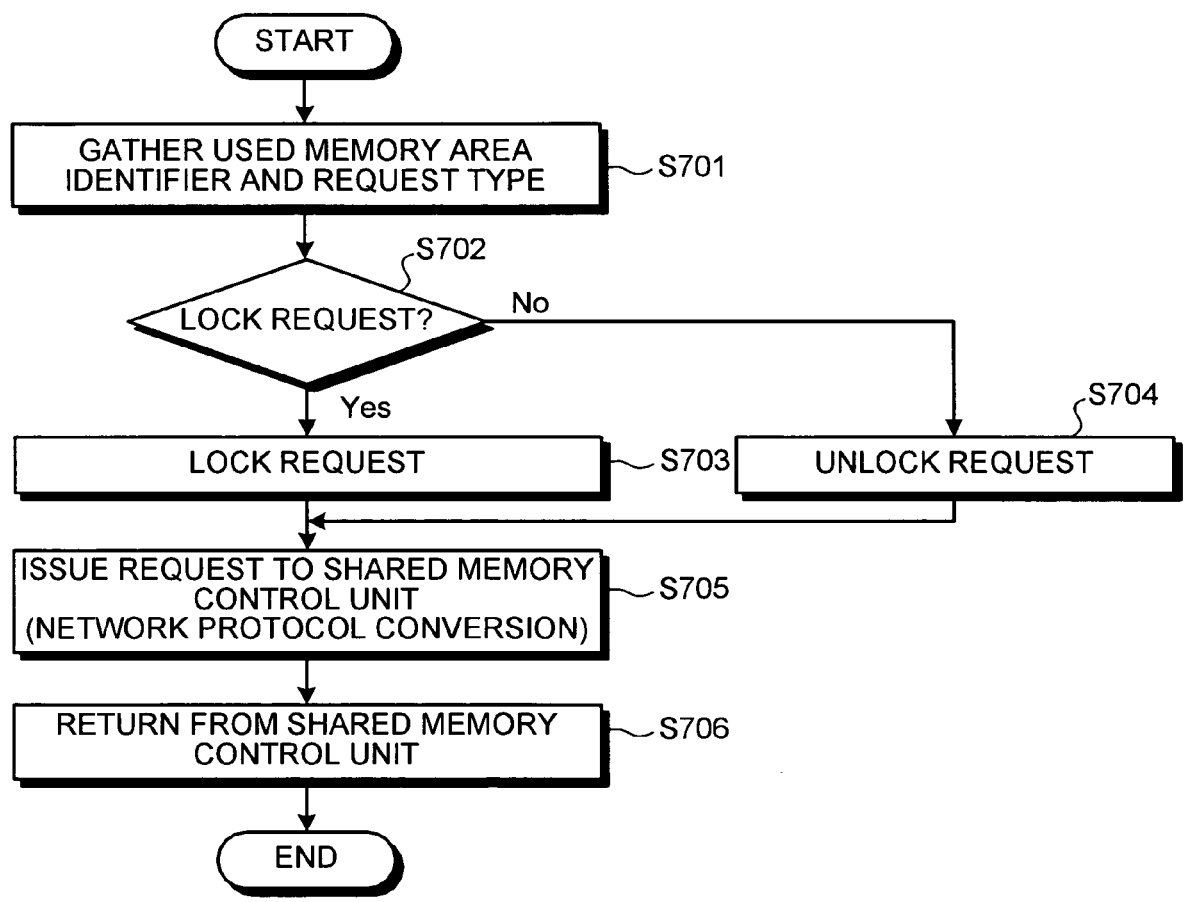
FIG. 9 is a flowchart of a shared memory locking and unlocking process.

FIG. 9 is a flowchart of a shared memory lock and unlock process. As shown in FIG. 9, the shared memory access function providing unit 11 gathers a used memory area identifier and a request type, which is either lock or unlock, from the application (step S701).

The shared memory access function providing unit 11 determines whether the request type is a lock request (step S702). If the request to the shared memory control unit 120 of the FC switch 100 is for exclusive allocation, the shared memory access function providing unit 11 considers the request as a lock request (step S703). Otherwise, the shared memory access function providing unit 11 considers the request as an unlock request (step S704).

Based on the used memory area identifier and the request type, the shared memory access function providing unit 11 issues a request to the shared memory control unit 120 of the FC switch 100 (step S705). In other words, the shared memory access function providing unit 11 performs a protocol conversion to transmit the lock or unlock shared memory request from the application to the FC switch 100.

The shared memory access function providing unit 11 receives from the shared memory control unit 120 a response to the issued lock or unlock shared memory request is received from the shared memory control unit 120, and passes the received response to the application (step S706).

Thus, by requesting the FC switch 100 to lock or unlock the shared memory based on the lock or unlock shared memory request from the application, the shared memory access function providing unit 11 enables locking or unlocking of the shared memory in the FC switch 100 that is shared by the hosts.

Figure 10:
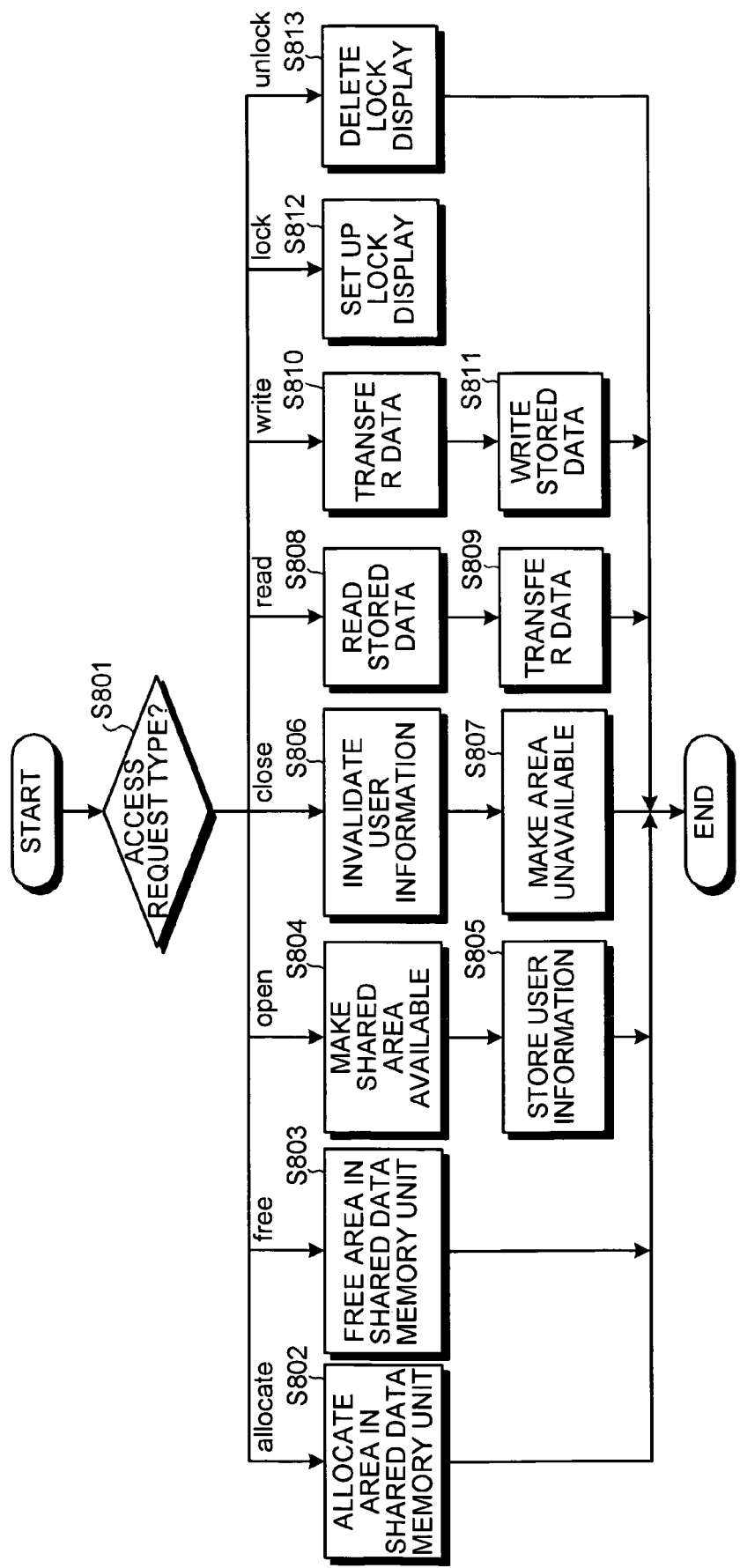
FIG. 10 is a flowchart of a process performed by a shared memory control unit shown in FIG. 2.

The process of the shared memory control unit 120 shown in FIG. 2 is explained next. FIG. 10 is a flowchart of the process of the shared memory control unit 120 shown in FIG. 2. As shown in FIG. 10, the shared memory control unit 120 first determines the type of the access shared memory request received from the access shared memory request identifying unit 110 (step S801).

Thus, if the access shared memory request is "allocate" indicating allocation of the shared memory, the shared memory control unit 120 allocates an area in the shared data memory unit 140 (step S802). If the access shared memory request is "free" indicating release of the shared memory, the shared memory control unit 120 frees the area in the shared data memory unit 140 (step S803).

If the access shared memory request is "open" indicating opening of the shared memory, the shared memory control unit 120 makes available the shared area (step S804), and stores user information, which is the information of the host using the shared area (step S805).

If the access shared memory request is "close" indicating closing of the shared memory, the shared memory control unit 120 invalidates the associated user information stored in the shared area (step S806), and makes the shared area unavailable (step S807).

If the access shared memory request is "read" indicating reading of the shared memory, the shared memory control unit 120 reads the data stored in the shared area (step S808), and transfers the read data to the host (step S809).

If the access shared memory request is "write" indicating writing of the shared memory, the shared memory control unit 120 transfers the data from the host (step S810), and writes the data to the shared area (step S811).

If the access shared memory request is "lock" indicating locking of the shared memory, the shared memory control unit 120 sets a lock display for the shared area (step S812), and if the access shared memory request is "unlock" indicating unlocking of the shared memory, the shared memory control unit 120 deletes the lock display for the shared area (step S813).

Thus, the shared memory control unit 120 controls the access to the shared data memory unit 140 based on the access shared memory request received from the access shared memory request identifying unit 110, thereby making available the shared memory access functions to the applications.

In the present embodiment, the shared memory access function providing unit 11 of each host, receives an access shared memory request from the application, and issues the access shared memory request to the FC switch 100. The access shared memory request identifying unit 110 determines whether the request from the host is an access shared memory request, and if the request is an access shared memory request, the shared memory control unit 120 controls the access to the shared data memory unit 140 based on the access shared memory request. Thus, the shared memory can be made available to the applications run in the hosts 10 through 30.

In the present embodiment, processing units such as the access shared memory request identifying unit 110, the shared memory control unit 120, and the disk control unit 130 are provided. However, the functions of these processing units can be implemented on a computer by executing a computer program. A computer that can execute such a computer program is explained next.

Figure 11:
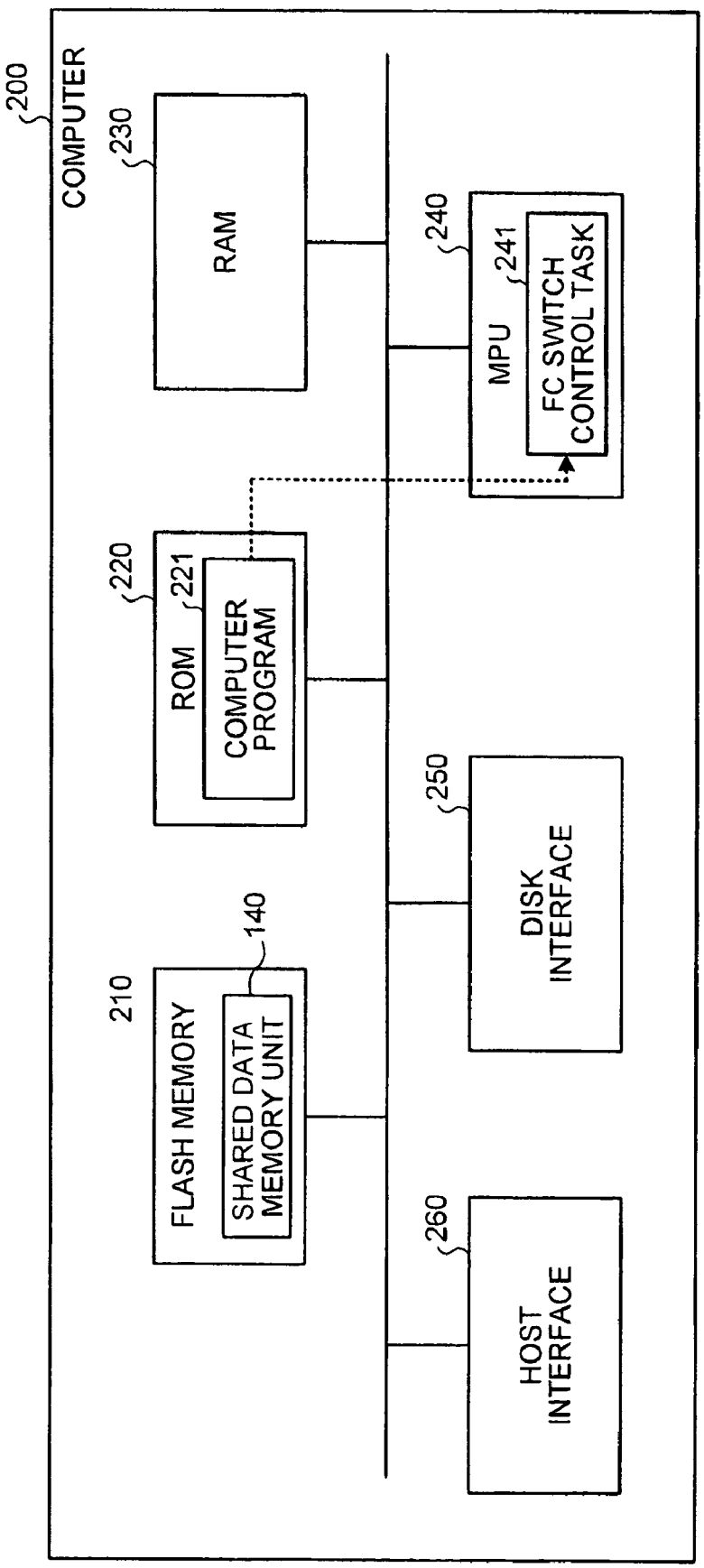
FIG. 11 is a functional block diagram of a computer that executes a computer program to implement the method according to the present embodiment.

FIG. 11 is a functional block diagram of a computer that executes the computer program. As shown in FIG. 11, a computer 200 includes a flash memory 210, a read only memory (ROM) 220, a random access memory (RAM) 230, a multi processor unit (MPU) 240, a disk interface 250, and a host interface 260.

The flash memory 210 is a nonvolatile memory that includes the shared data memory unit 140 used as the shared memory. The ROM 220 is a read only memory and stores a computer program 221 and other data.

The RAM 230 stores results during the execution of the computer program 221, and the MPU 240 is a processing device that executes an FC switch control task 241 by reading the computer program 221 from the ROM 220.

The disk interface 250 is an interface that facilitates the exchange of data, etc. between the computer 200, which is the FC switch 100, and the disk device connected to the FC switch 100. The host interface 260 is an interface that facilitates the exchange of data between the computer 200 and the hosts 10 through 30.

It is explained above that the shared memory is in the FC switch. However, the same effects can be achieved even if the shared memory is provided in the other network devices such as an IP switch.

Thus, according to the present invention, the host computers can use the memory device of the network device as the shared memory even if the host computers operate on different operating systems.

Moreover, access requests to the shared memory are controlled separately from requests that are not access requests. Consequently, shared memory can be provided without affecting the other functions provided by the network device.

Furthermore, the host computers with different operating systems can use the memory device of the network device as the shared memory. Consequently, a shared memory can be provided, which is shared by the host computers with different operating systems.

Moreover, the host computers can use the memory device of the fiber channel switch as the shared memory. Consequently, a shared memory can be provided, which is shared by a plurality of host computers.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fiber channel switch that accesses a disk device based on disk access requests from a plurality of host computers having different operating systems, comprising:
    a shared data memory unit that is used for sharing data among the host computers; and
    an access control unit that controls access of the shared data memory unit by the host computers.

2. The fiber channel switch according to claim 1, further comprising:
    an access request identifying unit that determines whether a request from the host computers is an access request to the shared data memory unit, wherein
    the access control unit controls the access of the shared data memory unit against a request identified by the access request identifying unit as the access request to the shared data memory unit.

3. The fiber channel switch according to claim 1, wherein the access control unit carries out an exclusive control of the shared data memory unit.

4. The fiber channel switch according to claim 1, wherein the shared data memory unit is a flash memory.

5. A shared memory access control method of a fiber channel switch that accesses a disk device based on disk access requests from a plurality of host computers having different operating systems, comprising:
    receiving a shared memory access request to access shared memory provided in the fiber channel switch for sharing data among the host computers from an application executed on one of the host computers; and
    controlling access of the shared memory based on the shared memory access request received.

6. A computer-readable recording medium that stores therein a computer program that causes a computer in a fiber channel switch, which accesses a disk device based on disk access requests from a plurality of host computers having different operating systems, to execute:
    receiving a shared memory access request to access a shared memory provided in the fiber channel switch for sharing data among the host computers from an application executed on one of the host computers; and
    controlling access of the shared memory, based on the shared memory access request received.

* * * * *